US010358545B2

(12) United States Patent
Hu et al.

(10) Patent No.: US 10,358,545 B2
(45) Date of Patent: Jul. 23, 2019

(54) DYNAMIC VULCANIZATION OF A BLEND COMPOSITION, METHODS OF MANUFACTURE THEREOF AND ARTICLES COMPRISING THE SAME

(71) Applicant: DOW GLOBAL TECHNOLOGIES LLC, Midland, MI (US)

(72) Inventors: Yushan Hu, Pearland, TX (US); Kim L. Walton, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 92 days.

(21) Appl. No.: 15/532,630

(22) PCT Filed: Nov. 23, 2015

(86) PCT No.: PCT/US2015/062093
§ 371 (c)(1),
(2) Date: Jun. 2, 2017

(87) PCT Pub. No.: WO2016/089647
PCT Pub. Date: Jun. 9, 2016

(65) Prior Publication Data
US 2017/0355840 A1 Dec. 14, 2017

Related U.S. Application Data

(60) Provisional application No. 62/086,354, filed on Dec. 2, 2014.

(51) Int. Cl.
| C08L 23/12 | (2006.01) |
| C08L 23/08 | (2006.01) |
| B29C 35/02 | (2006.01) |
| C08F 4/6592 | (2006.01) |
| C08J 3/24 | (2006.01) |
| C08L 23/14 | (2006.01) |

(52) U.S. Cl.
CPC .............. *C08L 23/12* (2013.01); *B29C 35/02* (2013.01); *C08F 4/65927* (2013.01); *C08J 3/242* (2013.01); *C08L 23/0876* (2013.01); *C08L 23/142* (2013.01); *C08L 2205/03* (2013.01); *C08L 2205/035* (2013.01); *C08L 2205/08* (2013.01); *C08L 2312/00* (2013.01); *C08L 2314/06* (2013.01)

(58) Field of Classification Search
CPC .......... C08L 23/0876; C08L 23/12; C08J 3/24
See application file for complete search history.

(56) References Cited

U.S. PATENT DOCUMENTS

| 5,504,172 A | 4/1996 | Imuta et al. |
| 5,721,314 A | 2/1998 | Hausmann |
| 5,783,638 A | 7/1998 | Lai et al. |
| 5,919,983 A | 7/1999 | Rosen et al. |
| 6,207,761 B1 | 3/2001 | Smith et al. |
| 6,525,157 B2 | 2/2003 | Cozewith et al. |
| 6,960,635 B2 | 11/2005 | Stevens et al. |
| 7,199,203 B2 | 4/2007 | Stevens et al. |
| 8,076,147 B2 | 12/2011 | Damme et al. |
| 8,785,554 B2 | 7/2014 | Li Pi Shan et al. |
| 2003/0092846 A1 | 5/2003 | Zhao et al. |
| 2004/0102581 A1 | 5/2004 | Dang et al. |
| 2005/0148727 A1 | 7/2005 | Ajbani et al. |
| 2006/0020086 A1* | 1/2006 | Smith ................. C08L 23/0807 525/240 |
| 2011/0034590 A1 | 2/2011 | Kuhn et al. |
| 2011/0152499 A1 | 6/2011 | Winniford et al. |
| 2011/0313106 A1 | 12/2011 | Shan et al. |
| 2011/0313108 A1* | 12/2011 | Shan ...................... C08L 23/10 525/95 |

FOREIGN PATENT DOCUMENTS

| WO | 0001745 A1 | 1/2000 |
| WO | 0228957 A1 | 4/2002 |
| WO | 2012044730 A1 | 4/2012 |

OTHER PUBLICATIONS

Ha et al.; "Fracture toughness investigation of the dynamically vulcanized EPDM/PP/ionomer ternary blends using the J-integral via the locus method"; Journal of Materials Science; 31; 1996, pp. 2917-2924.
International Search Report for International Application No. PCT/US2015/062093, International Filing Date Nov. 23, 2015, dated Feb. 1, 2016, 6 pages.
Kim et al.; "The Control of Miscibility of PP/EPDM Blends by Adding Ionomers and Applying Dynamic Vulcanization"; Polymer Engineering and Science; vol. 35, No. 20; Oct. 1995; pp. 1592-1599.
Written Opinion for International Application No. PCT/US2015/062093, International Filing Date Nov. 23, 2015, dated Feb. 1, 2016, 6 pages.

* cited by examiner

Primary Examiner — Mark S Kaucher
(74) Attorney, Agent, or Firm — Cantor Colburn LLP

(57) ABSTRACT

Disclosed herein is a composition comprising a propylene based polymer; a polymeric ethylene ionomer; a vulcanizing agent that is a crosslinker and that is reactive with the polymeric ethylene ionomer; and a compatibilizer that is a crystalline block composite including (1) a crystalline ethylene based polymer, (2) a crystalline alpha-olefin based polymer derived from a $C_{3-10}$ α-olefin, and (3) a block copolymer comprising 10 to 90 wt % of a crystalline ethylene block comprising at least 85 wt % of units derived from ethylene and 10 to 90 wt % of a crystalline alpha-olefin block comprising at least 90 wt % of units derived from the $C_{3-10}$ α-olefin.

9 Claims, No Drawings

DYNAMIC VULCANIZATION OF A BLEND COMPOSITION, METHODS OF MANUFACTURE THEREOF AND ARTICLES COMPRISING THE SAME

CROSS REFERENCE TO RELATED APPLICATIONS

This application is a National Stage application of PCT/US2015/062093, filed Nov. 23, 2015, which claims the benefit of U.S. Provisional Application No. 62/086,354, filed Dec. 2, 2014, both of which are incorporated by reference in their entirety herein.

BACKGROUND

This disclosure relates to the dynamic vulcanization of a blend composition, methods of manufacture thereof and to articles comprising the same.

Polypropylene (PP) is often used in the packaging industry in the form of films and containers for packaging food and non-food products. Polypropylene packages provide advantages of high stiffness, good clarity, and high temperature performance. Polypropylene or thermoplastic polyolefin (TPO) is also frequently used in the automotive industry for exterior and interior body panels. Such panels and parts provide benefits of low weight, flexible styling and lower cost. However, these panels are subject to limitations that include poor printability, poor paintability as well as poor scratch and mar resistance.

It is therefore desirable to develop polypropylene products that provide the benefits of low weight, flexible styling, desired bond strength, and lower cost while at the same time affording qualities of suitable printability, paintability and/or improved scratch resistance.

SUMMARY

Disclosed herein is a composition comprising a propylene based polymer; a polymeric ethylene ionomer; a vulcanizing agent that is a crosslinker and that is reactive with the polymeric ethylene ionomer; and a compatibilizer that is a crystalline block composite including: (1) a crystalline ethylene based polymer, (2) a crystalline alpha-olefin based polymer derived from a $C_{3-10}$ α-olefin, and (3) a block copolymer comprising 10 to 90 wt % of a crystalline ethylene block comprising at least 85 wt % of units derived from ethylene and 10 to 90 wt % of a crystalline alpha-olefin block comprising at least 90 wt % of units derived from the $C_{3-10}$ α-olefin.

Disclosed herein too is a method comprising masticating a composition comprising polypropylene, a polymeric ethylene ionomer, a compatibilizer that compatibilizes the polypropylene with the ionomer, and a vulcanizing agent, the compatibilizer being a crystalline block composite that includes (1) a crystalline ethylene based polymer, (2) a crystalline alpha-olefin based polymer derived from a $C_{3-10}$ α-olefin, and (3) a block copolymer comprising 10 to 90 wt % of a crystalline ethylene block comprising at least 85 wt % of units derived from ethylene and 10 to 90 wt % of a crystalline alpha-olefin block comprising at least 90 wt % of units derived from the $C_{3-10}$ α-olefin; vulcanizing the ionomer during mastication; and molding the composition.

DETAILED DESCRIPTION

Disclosed herein is a composition comprising polypropylene, a polymeric ionomer, a compatibilizer that compatibilizes the polypropylene with the ionomer, and a vulcanizing agent. The vulcanizing agent facilitates crosslinking of the ionomer. The composition is dynamically vulcanized and the resulting vulcanized composition possesses excellent scratch/mar resistance, good tensile toughness and good adhesion to polypropylene substrates. Also, disclosed herein is a method comprising blending the aforementioned composition at a temperature that is effective to facilitate vulcanizing the ionomer in the composition. Without being limited to this theory, it is believed that the vulcanizing of the ionomer produces a phase inversion in the composition making the polypropylene, which is generally present in the composition in a smaller amount than the ionomer the continuous phase (i.e., the matrix) of the composition. The composition is then molded to form a desired article.

Propylene Based Polymer

As noted above, the composition comprises a propylene based polymer that may be referred to as a polypropylene. The propylene based polymer may be selected from homopolymer polypropylene, random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), or a combination comprising at least one of the foregoing propylene based polymers.

The polypropylene may be in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5-7 wt % ethylene copolymerized with the propylene), however, can also be used in the compositions disclosed herein. A complete discussion of various polypropylene polymers is contained in Modern Plastics Encyclopedia/89, mid October 1988 Issue, Volume 65, Number 11, pp. 86-92, the entire disclosure of which is incorporated herein by reference. The molecular weight and hence the melt flow rate of the polypropylene for use in the present invention varies depending upon the application. The melt flow rate for the polypropylene useful herein is generally from about 0.1 grams/10 minutes (g/10 min), measured as per ASTM D1238 at 230° C. and 2.16 kg) to about 100 g/10 min, preferably 0.5 g/10 min to about 80 g/10 min, and more preferably 4 g/10 min to about 70 g/10 min. For example, the melt flow rate may be from 20 g/10 min to 50 g/10 min, 20 g/10 min to 40 g/10 min, and/or 30 g/10 min to 40 g/10 min.

It is desirable for the propylene based polymer to be present in the composition in an amount of 20 to 90 weight percent (wt %), preferably 30 to 70 wt %, based on the total weight of the composition. The propylene based polymer may be present in a same amount or lesser amount relative to the polymeric ionomer. For example, the propylene based polymer may account from less than 50 wt % of the total weight of the composition (e.g., and at least 15 wt % and/or at least 31 wt % of the total weight of the composition). For example, the range may be from 31 wt % to 50 wt % and/or 31 wt % to 45 wt %.

In an embodiment, the polypropylene based polymer may be used as a blend of two different polypropylenes—a first polypropylene and a second polypropylene having two different molecular weights. The first polypropylene has a melt flow rate of 0.1 to 15, preferably 1 to 5 grams/10 minutes (g/10 min) when measured as per ASTM D1238 at 230° C., while the second polypropylene has a melt flow rate of 20 to 50, preferably 25 to 40 grams/10 minutes (g/10 min) when measured as per ASTM D 1238 at 230° C. and 2.16 kg.

The propylene based polymer can be a polypropylene homopolymer, or it can be a random copolymer or even an impact copolymer (which already contains a rubber phase). Examples of such propylene polymers include VISTA-MAXX™ (commercially available from ExxonMobil Chemical Company), VERSIFY™ (commercially available from The Dow Chemical Company), propylene polymers commercially available from Braskem under various tradenames and/or trademarks, and PROFAX® (commercially available from Lyondell Basell).

Polymeric Ionomer

The composition comprises a polymeric ionomer such as an ethylene containing ionomer also referred to as a polymeric ethylene ionomer. For example, the ethylene ionomer comprises an acrylic acid ethylene copolymer that is neutralized with a metal salt (e.g., by using a cation). The presence of the ionomer may facilitate the development of scratch resistance in articles that are manufactured from the composition.

The acrylic acid ethylene copolymer is a polymer that can comprise repeat units in an amount of 5 to 50 wt %, preferably 10 to 20 wt %, and more preferably 12 to 15 wt %, by weight of a polar monomer such as acrylic acid, alkyl acrylic acid, or alkyl acrylate (additional examples are provided below), or combinations thereof, based on the total weight of the ethylene copolymer. The alkyl group may comprise 1 to 20 carbon atoms. The remainder of the copolymer is an ethylene polymer. Ethylene polymers including ethylene-α-olefin copolymers (defined above) may be used in the acrylic acid ethylene copolymer or in the ethylene ionomers (detailed below). The acrylic acid ethylene copolymer is either a random or block copolymer and is preferably a random copolymer.

Examples of such polar monomers include acrylic acid, methacrylic acid, ethacrylic acid, methyl acrylate, ethyl acrylate, methyl methacrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimethyl fumarate, vinyl acetic acid, vinyl acetate, vinyl propionate, or combinations thereof.

The ethylene copolymer may comprise up to 35 wt % of an optional comonomer such as carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoester, a salt of these acids, glycidyl acrylate, glycidyl methacrylate, and glycidyl vinyl ether, or combinations thereof.

In an embodiment, the acid moiety of an ethylene copolymer is neutralized with a cation to produce the ionomer. The neutralization, for example, can be 0.1 to 100, preferably 10 to 90, preferably 20 to 80, and more preferably 20 to about 40 wt %, based on the total carboxylic acid content, with a metallic ion. The metallic ions can be monovalent, divalent, trivalent, multivalent, or combinations of two or more thereof. Examples include Li, Na, K, Ag, Hg, Cu, Be, Mg, Ca, Sr, Ba, Cd, Sn, Pb, Fe, Co, Zn, Ni, Al, Sc, Hf, Ti, Zr, Ce, or combinations thereof. If the metallic ion is multivalent, a complexing agent, such as stearate, oleate, salicylate, and phenolate radicals can be included. Exemplary metallic ions are Na, Ca or Zn.

The ionomer can also be a blend of an ionomer having a greater than 20% neutralization and, for example, an ethylene (meth)acrylic acid copolymer to achieve the desired degree of neutralization.

Examples of ethylene copolymers that are neutralized to produce the ionomer include ethylene/methyl acrylate (EMA), ethylene/ethyl acrylate (EEA), ethyl acrylate (EA), ethylene/butyl acrylate (EBA), ethylene/isobutyl acrylate/ methacrylic acid, ethylene/methyl acrylate/maleic anhydride, ethylene/butyl acrylate/glycidyl methacrylate (EBAGMA) and ethylene/butyl acrylate/carbon monoxide (EBACO), and butylacrylate (BA). Examples of commercially available ethylene ionomers include those available from E. I. du Pont de Nemours and Company (DuPont), Wilmington, Del., commercially marketed as SURLYN® and from The Dow Chemical Company, commercially marketed as AMPLIFY™ IO.

The ethylene polymeric ionomer is present in an amount of 20 to 90 wt %, preferably 30 to 70 wt %, more preferably 40 to 65 wt %, based on the total weight of the composition. In one embodiment, the ethylene ionomer is present in the composition in a greater amount than the propylene based polymer.

Compatibilizer

The composition also comprises a compatibilizer to compatibilize the polypropylene with the ionomer. In a preferred embodiment, the compatibilizer comprises a crystalline block copolymer composite (CBC). The term "crystalline block composite" (CBC) refers to polymers having three components: a crystalline ethylene based polymer (CEP) (also referred to herein as a soft polymer), a crystalline alpha-olefin based polymer (CAOP) (also referred to herein as a hard polymer), and a block copolymer comprising a crystalline ethylene block (CEB) and a crystalline alpha-olefin block (CAOB), wherein the CEB of the block copolymer is the same composition as the CEP in the block composite and the CAOB of the block copolymer is the same composition as the CAOP of the block composite. The CAOP and the CAOB are derived from a $C_{3-10}$ α-olefin, such as at least one selected from the group of $C_{3-10}$ α-olefins. The same alpha-olefin is present in both the CAOP and the CAOB. Additionally, the compositional split between the amount of CEP and CAOP will be essentially the same as that between the corresponding blocks in the block copolymer.

When produced in a continuous process, the crystalline block composites desirably have a polydispersity index (PDI or Mw/Mn) from 1.7 to 15, preferably 1.8 to 10, preferably from 1.8 to 5, more preferably from 1.8 to 3.5. Such crystalline block composites are described in, for example, US Patent Application Publication Nos. 2011/0313106, 2011/0313108 and 2011/0313108, all published on Dec. 22, 2011, incorporated herein by reference with respect to descriptions of the crystalline block composites, processes to make them and methods of analyzing them.

CAOB refers to highly crystalline blocks of polymerized alpha olefin units in which the monomer is present in an amount greater than 90 mole percent (mol %), preferably greater than 93 mole percent, more preferably greater than 95 mole percent, and preferably greater than 96 mole percent. In other words, the comonomer content in the CAOBs is less than 10 mole percent, and preferably less than 7 mole percent, and more preferably less than 5 mole percent, and most preferably less than 4 mole percent. For example, the CAOBs may include at least 90 wt % of one $C_{3-10}$ α-olefin (e.g., from 90.0 wt % to 99.9 wt %, from 95.0 wt % to 99.9 wt %, and/or from 98.0 wt % to 99.9 wt %). CAOBs with crystalline polypropylene have corresponding melting points that are 80° C. and above, preferably 100° C. and above, more preferably 115° C. and above, and most preferably 120° C. and above. In some embodiments, the CAOB comprise all or substantially all propylene units.

CEB refers to blocks of polymerized ethylene units. The comonomer (e.g., one of a $C_{3-10}$ α-olefin) content in the CEB may be 10 mol % or less, preferably between 1 mol % and 10 mol %, more preferably between 2 mol % and 7 mol % and most preferably between 2 mol % and 5 mol %. For example, the CEB may include at least 85 wt % (e.g., from 85.0 wt % to 99.0 wt %, from 87.0 wt % to 95.0 wt %, and/or from 89.0 wt % to 93.0 wt %) of units derived from ethylene. The remainder may be at least one $C_{3-10}$ α-olefin, such as when the CAOB includes propylene (C3) the remainder in the CEB is also propylene. Such CEB have corresponding melting points that are preferably 75° C. and above, more preferably 90° C., and 100° C. and above.

In one embodiment, the crystalline block composite polymers comprise propylene, 1-butene or 4-methyl-1-pentene and one or more comonomers. Preferably, the block composites comprise in polymerized form propylene and ethylene and/or one or more C4-10 α-olefin comonomers, and/or one or more additional copolymerizable comonomers or they comprise 4-methyl-1-pentene and ethylene and/or one or more $C_{4-10}$ α-olefin comonomers, or they comprise 1-butene and ethylene, propylene and/or one or more $C_5$-$C_{10}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. Preferably, the monomer is propylene and the comonomer is ethylene. For example, the block copolymer may include a crystalline isotactic polypropylene block and a crystalline ethylene-propylene block (i.e., an iPP-EP block copolymer).

Comonomer content in the crystalline block composite polymers may be measured using any suitable technique, with techniques based on nuclear magnetic resonance (NMR) spectroscopy preferred.

The block composites and crystalline block composites have a melting point Tm greater than 85° C. preferably greater than 120° C., and more preferably greater than 125° C. In an embodiment, the Tm is in the range of from 100° C. to 170° C., more preferably from 120° C. to 160° C. Preferably the melt flow ratio (MFR) of the block composites and crystalline block composites is from 0.1 to 1000 dg/10 min, more preferably from 0.1 to 100 dg/10 min and more preferably from 3 to 60 dg/10 min. For example, the MFR may be from 2 to 10 g/10 min and/or 2 to 5 g/10 min. MFR is measured at 230° C. and 2.16 kg, according to ASTM D 1238.

In an embodiment, the block composites and crystalline block composites have a weight average molecular weight (Mw) from 10,000 to 2,500,000 grams per mole (g/mole), preferably from 35000 to 1,000,000 and more preferably from 50,000 to 300,000, preferably from 50,000 to 200,000 g/mole.

The crystalline block composite polymers comprise 0.5 to 95 wt % soft copolymer (i.e., CEP), from 0.5 to 95 wt % hard polymer (i.e., CAOP), and from 5 to 99 wt % block copolymer. More preferably, the crystalline block composite polymers comprise from 0.5 to 79 wt % soft copolymer, from 0.5 to 79 wt % hard polymer and from 20 to 99 wt % block copolymer and more preferably from 0.5 to 49 wt % soft copolymer, from 0.5 to 49 wt % hard polymer and from 50 to 99 wt % block copolymer. Weight percents are based on total weight of crystalline block composite. The sum of the weight percents of soft copolymer, hard polymer and block copolymer equals 100%. In an embodiment, the block copolymers of the crystalline block composite comprise from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. More preferably, the block copolymers comprise 25 to 75 wt % CEB and 75 to 25 wt % CAOB, and even more preferably comprise 30 to 70 wt % CEB and 70 to 30 wt % CAOB. In an exemplary embodiment, the weight ratio of CEB to CAOB is from 0.9:1.1 to 1.1:0.9.

In some embodiments, the crystalline block composites have a Crystalline Block Composite Index (CBCI) that is greater than zero but less than 1.0 and/or 0.9 (e.g., from 0.1 to 0.8). In other embodiments, CBCI is greater than 0.4 and less than 1.0. In some embodiments, the CBCI is 0.1 to 0.9, from about 0.1 to about 0.8, from about 0.1 to about 0.7 or from about 0.1 to about 0.6. Additionally, the CBCI can be in the range of from about 0.4 to about 0.8, from about 0.5 to about 0.8, or from about 0.6 to about 0.9. In some embodiments, CBCI is in the range of from about 0.3 to about 0.9, from about 0.3 to about 0.8, or from about 0.5 to about 0.8. In other embodiments, CBCI is in the range of from about 0.4 to less than about 1.0, from about 0.5 to less than about 1.0, or from about 0.6 to less than about 1.0, from about 0.7 to less than about 1.0, from about 0.8 to less than about 1.0, or from about 0.9 to less than about 1.0.

The crystalline block composite may be present in an amount of 1 to 20 wt %, preferably 2 to 15 wt %, and more preferably 3 to 10 wt %, based on the total weight of the composition.

The composition may also comprise in addition to the crystalline block composite (CBC), an optional elastomer that comprises either polypropylene or polyethylene. The optional elastomer can be an ethylene-α-olefin copolymer or a polypropylene-α-olefin copolymer (that is different from the CBC), or the like, or a combination comprising at least one of the foregoing elastomers. For example, the composition may also contain an elastomer that toughens the composition.

Ethylene-α-olefin copolymers for use in the composition can be made with a single-site catalyst such as a metallocene catalyst or constrained geometry catalyst, and typically have a melting point of less than 105, preferably less than 90, more preferably less than 85, even more preferably less than 80 and still more preferably less than 75° C. The melting point is measured by differential scanning calorimetry (DSC) as described, for example, in U.S. Pat. No. 5,783,638. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane.

Illustrative homogeneously branched ethylene-α-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random copolymers or block copolymers.

Examples of commercially available homogeneously branched ethylene-α-olefin interpolymers useful in the composition include homogeneously branched, linear ethylene-α-olefin copolymers (e.g. TAFMER® by Mitsui Petrochemicals Company Limited and Exact™ by ExxonMobil Chemical Company), and the homogeneously branched, substantially linear ethylene-α-olefin polymers (e.g., AFFINITY™ and ENGAGE™ polyethylene available from The Dow Chemical Company). Blends of any of these interpolymers can also be used in the composition. An exemplary blend is AFFINITY™ PL1880G commercially available from The Dow Chemical Company.

The polypropylene-α-olefin copolymer may comprise random or block propylene based polymers. The random polypropylene elastomer typically comprises 90 or more mole percent units derived from propylene. The remainder of the units in the propylene copolymer is derived from units of at least one α-olefin.

The α-olefin component of the propylene-α-olefin copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, and the like) are α-olefins for purposes of this disclosure.

Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

In one embodiment the random polypropylene copolymer has a $T_m$ greater than 120° C., and/or a heat of fusion greater than 70 J/g (both measured by DSC) and preferably, but not necessarily, made via Ziegler-Natta catalysis.

In another embodiment, the polyolefin elastomer is a propylene-α-olefin interpolymer and is characterized as having substantially isotactic propylene sequences. The propylene-α-olefin interpolymers include propylene-based elastomers (PBE). "Substantially isotactic propylene sequences" means that the sequences have an isotactic triad (mm) measured by 13C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by 13C NMR spectra.

The propylene-α-olefin copolymer comprises units derived from propylene and polymeric units derived from one or more α-olefin comonomers. Exemplary comonomers utilized to manufacture the propylene-α-olefin copolymer are C2 and C4 to C10 α-olefins; for example, C2, C4, C6 and C8 α-olefins.

The propylene-α-olefin interpolymer comprises 1 to 40 percent by weight of one or more alpha-olefin comonomers. All individual values and sub-ranges from 1 to 40 weight percent are included herein and disclosed herein. The propylene-α-olefin interpolymer may have a melt flow rate in the range of 0.1 to 500 grams per 10 minutes (g/10 min), measured in accordance with ASTM D-1238 (at 230° C./2.16 Kg). The propylene-α-olefin interpolymer has crystallinity in the range of from at least 1 percent by weight (a heat of fusion ($H_f$) of at least 2 Joules/gram (J/g)) to 30 percent by weight (a $H_f$ of less than 50 J/g). The propylene-α-olefin interpolymer has a density of typically less than 0.895 g/cm$^3$. The propylene-α-olefin interpolymer has a melting temperature ($T_m$) of less than 120° C. and a heat of fusion ($H_f$) of less than 70 Joules per gram (J/g) as measured by differential scanning calorimetry (DSC) as described in U.S. Pat. No. 7,199,203. The propylene-α-olefin interpolymer has a molecular weight distribution (MWD), defined as weight average molecular weight divided by number average molecular weight (Mw/Mn) of 3.5 or less; or 3.0 or less; or from 1.8 to 3.0.

Such propylene-α-olefin interpolymers are further described in the U.S. Pat. Nos. 6,960,635 and 6,525,157, the entire contents of which are incorporated herein by reference. Such propylene-α-olefin interpolymers are commercially available from The Dow Chemical Company, under the trade name VERSIFY™, or from ExxonMobil Chemical Company, under the trade name Vistamaxx™.

The optional elastomer may be used in the composition in an amount of 1 to 50 wt %, preferably 2 to 30 wt % based on the total weight of the composition.

Vulcanizing Agent

The composition further comprises a vulcanizing agent that is used to crosslink the composition. The vulcanizing agent is any multifunctional reagent capable of reacting with a carboxylic acid containing resin. Examples include multifunctional hydroxyl containing compounds such as ethylene glycol, multifunctional amines such as triethylene tetramine and multifunctional epoxies such as bisphenol A epoxy resin. Of greatest commercial interest are multifunctional amines and epoxies. Exemplary examples of amine vulcanizing agents include triethylene tetramine, methylene dianiline, and a blend of guanidine and a hexamethylene diamine carbamate. A blend of guanidine and a hexamethylene diamine carbamate are preferred amine embodiments. A commercial example of an amine based vulcanizing compound is Diak™ #1, available from E. I. du Pont de Nemours and Company. Exemplary examples of epoxy vulcanizing agents include bisphenol A epoxy resin, 3,4 epoxy cyclohexyl methyl-3,4-epoxy cyclohexyl carboxylate, and olefin copolymers containing oxirane groups. Olefin copolymers containing oxirane groups are preferred. Examples of unsaturated oxirane containing monomers capable of copolymerizing with an olefin are glycidyl acrylate, glycidyl methacrylate, and the like, or a combination thereof. Glycidyl acrylate or glycidyl methacrylate may be copolymerized with an olefin in a high pressure free radical tubular and/or autoclave process or grafted on to an olefin based copolymer grafting compound. One or more, preferably one, grafting compound is grafted onto the olefin polymer. The copolymer may be a terpolymer and may contain both an unsaturated carboxylic acid as well as a derivative of an unsaturated carboxylic in addition to the polyolefin.

The content of the grafted compound in the vulcanizing agent is 2 to 20 wt %, preferably 3 to 15 wt %, based on the total weight of the vulcanizing agent (i.e. the grafted olefin copolymer).

The graft process can be initiated by decomposing initiators to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). The oxirane containing olefin polymer is copolymerized from the list provided above. By the term "olefin polymer" is meant an ethylene polymer, a propylene polymer, a blend of different ethylene polymers, a blend of different propylene polymers or a blend of at least one ethylene polymer and at least one propylene polymer. The olefin polymer preferably has a crystallinity of 5 to 75 weight percent, more preferably of 10 to 30 weight percent.

The olefin polymer can be an ethylene or propylene homopolymer or an interpolymer of propylene and at least one $C_4$-$C_{20}$-α-olefin and/or a $C_4$-$C_{18}$-diolefin. Preferably, the ethylene polymer is an interpolymer of ethylene and at least one $C_3$-$C_{20}$-α-olefin and/or a $C_4$-$C_{18}$-diolefin. Most preferably, the ethylene polymer is an interpolymer of ethylene and a $C_3$-$C_{20}$-α-olefin having a density of up to 0.902 g/cm$^3$. The term "interpolymer" as used herein refers to polymers prepared by the polymerization of at least two different monomers. The generic term interpolymer thus embraces copolymers, usually employed to refer to polymers prepared from two different monomers, and polymers prepared from more than two different monomers. The interpolymer can be a random or block interpolymer.

Preferred α-olefins contain 4 to 10 carbon atoms, of which 1-butene, 1-hexene, 4-methyl-1-pentene and 1-octene are the most preferred. Preferred diolefins are isoprene, butadiene, 1,4-pentadiene, 1,4-hexadiene, 1,5-hexadiene, 1,7-octadiene, 1, 9-decadiene, dicyclopentadiene, methylene-norbornene, and 5-ethylidene-2-norbornene. The interpolymers may contain other comonomers, such as a $C_2$-$C_{20}$ acetylenically unsaturated monomer.

The melt flow index ($I_2$) of the vulcanizing agent is 0.5 to 25 g/10 min, preferably 1 to 15 g/10 minutes when measured at 190° C. and 2.16 kg as per ASTM D 1238. For example, the I2 is from 1 to 10 g/10 minutes and/or 3 to 7 g/10 minutes.

The amount of the vulcanizing agent is 1 to 20 wt %, preferably 3 to 15 wt % and more preferably 4 to 10 wt %, based on the total weight of the composition. The compatibilizer and the vulcanizing agent may be present in the composition in a ratio from 0.8:1.2 to 1.2:0.8 and/or 0.9:1.1 to 1.1:0.9.

Composition

The composition may further comprise other additives such as mold release agents, antioxidants, antiozonants, colorants, thermal stabilizers, ultraviolet stabilizers, slip agents, reinforcing fillers, electrically conducting fillers, fibers, surfactants, or the like.

In one embodiment, in one method of manufacturing the composition, the ingredients are melt blended or solution blended in a device where it is subjected to shear, extensional and/or elongational forces. Melt blending is preferred. The melt blending may be conducted in devices where the aforementioned forces are applied to the composition by means of (are exerted by) a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Blending involving the aforementioned forces may be conducted in machines such as a single or multiple screw extruders, a Buss kneader, a Henschel, a helicone, a Haake Rheomix, a Ross mixer, a Banbury, roll mills, molding machines such as injection molding machines, vacuum forming machines, blow molding machine, or then like, or combinations comprising at least one of the foregoing machines. Blending is preferably conducted in a Banbury or in a Haake Rheomix and the composition is then injection or compression molded.

As noted above, during the blending, the composition is elevated to a temperature at which vulcanization occurs. Short vulcanization (curing) occurs during the mastication of the composition. The time period for the blending is also sufficient to produce a vulcanizate having the appropriate properties. In one embodiment, the composition is heated to a temperature greater than 150° C., preferably greater than 170° C., and more preferably greater than 190° C. prior to commencing the blending of the composition. The amount of blending depends upon the mass of material contained in the blending device and is conducted for a time period greater than 5 minutes, preferably greater than 10 minutes and preferably greater than 15 minutes. Post-blending heat treatments may also be conducted on the composition.

In one embodiment, the composition is vulcanized during mastication at a temperature of greater than 170° C. and where the vulcanized composition displays a tensile toughness of 2 to 15 in*lbf, a 2% secant modulus of 35,000 to 55,000 pounds per square inch and a Shore D hardness of 55 to 63.

In an embodiment, the composition upon undergoing blending is molded into an article of a desired shape. The molded article is then subjected to a post-blending heat treatment to further the vulcanization. This heat treatment may be conducted using conduction, convection or radiation. The heat treatment may be conducted after disposing a coating of paint on the article. Heat treatment involving a combination of radiation and convection is preferable. The radiation may include microwave and/or radiofrequency radiation.

In one embodiment, the composition may be used as part of a laminate. A first layer comprising the composition may be molded. Second and/or third layers that are disposed on opposing surfaces of the first layer may be separately molded or extruded. The second and/or the third layer is/are then disposed on opposing surfaces of the first layer to form the laminate. In one embodiment, the laminate may be produced by coextrusion.

In an exemplary embodiment, in the preparation of a laminate, the composition for each of the respective layers are fed to separate extruders. The compositions from the respective extruders are fed to a single die and are coextruded to form the multilayered film. The coextruded film may then blown or molded to form an article (of the desired thickness) from multilayered film. In an embodiment, the multilayered film after being coextruded is laminated in a roll mill having two or more rolls.

The composition disclosed herein is advantageous in that articles manufactured from the composition are mar resistant and scratch resistant. They display good mechanical properties and toughness, which is useful in automotive applications.

The composition disclosed herein and the method of manufacturing articles from the composition are exemplified in the following non-limiting examples.

EXAMPLES

Preparation of Crystalline Block Composite

The Crystalline Block Composite (CBC) is prepared using two continuous stirred tank reactors (CSTR) connected in series. The first reactor is approximately 12 gallons in volume while the second reactor is approximately 26 gallons. Each reactor is hydraulically full and set to operate at steady state conditions. Monomers, Solvent, Catalyst, Cocatalyst-1, Cocatalyst-2, and CSA-1 are flowed to the first reactor according to the process conditions outlined in Table 1. Then, the first reactor contents, as described in Table 1, below, are flowed to a second reactor in series. Additional Catalyst, Cocatalyst-1, and Cocatalyst-2 are added to the second reactor. Table 2, below, shows the analytical characteristics of CBC.

In particular, Catalyst-1 ([[rel-2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium) and Cocatalyst-1, a mixture of methyldi($C_{14-18}$ alkyl) ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2, are purchased from Boulder Scientific and used without further purification.

CSA-1 (diethylzinc or DEZ) and cocatalyst-2 (modified methylalumoxane (MMAO)) are purchased from Akzo Nobel and used without further purification.

The Solvent for the polymerization reaction is a hydrocarbon mixture (ISOPAR®E) obtainable from ExxonMobil Chemical Company and purified through beds of 13-X molecular sieves prior to use.

Referring to Table 1, the process conditions for producing the CBC are shown.

TABLE 1

| Condition | 1st Reactor | 2nd reactor |
|---|---|---|
| Reactor Control Temp. (° C.) | 118 | 110 |
| Solvent Feed (lb/hr) | 145 | 145 |
| Propylene Feed (lb/hr) | 2.3 | 31 |
| Ethylene Feed (lb/hr) | 27.8 | 0 |
| Reactor Propylene Conc. (g/L) | 1.04 | 2.03 |
| Catalyst Flow (lb/hr) | 1.16 | 0.95 |
| Catalyst Conc. (ppm) | 5 | 200 |
| Cocatalyst-1 Flow (lb/hr) | 1.50 | 0.93 |
| Cocatalyst-2 Flow (lb/hr) | 0.91 | 0 |
| DEZ Flow (lb/hr) | 1.10 | 0 |
| Production Rate (lb/hr) | 29 | 31 |

Referring to Table 2, below, the resultant CBC has the following properties.

Polymer Characterization Methods, a discussion of the methods used may also be found in, e.g., U.S. Pat. No. 8,785,554.

Melt flow rate (MFR) is measured in accordance with ASTM D-1238 (230° C.; 2.16 kg). The result is reported in grams/10 minutes.

Molecular weight distribution (MWD) is measured using Gel Permeation Chromatography (GPC). In particular, conventional GPC measurements are used to determine the weight-average (Mw) and number-average (Mn) molecular weight of the polymer, and to determine the MWD (which is calculated as Mw/Mn). Samples are analyzed with a high-temperature GPC instrument (Polymer Laboratories, Inc. model PL220). The method employs the well-known universal calibration method, based on the concept of hydrodynamic volume, and the calibration is performed using narrow polystyrene (PS) standards, along with four Mixed A 20 µm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M\text{polyethylene} = a*(M\text{polystyrene})^b.$$

In this equation, a=0.4316 and b=1.0 (as described in Williams and Ward, J. Polym. Sc., Polym. Let., 6, 621 (1968)). Polyethylene equivalent molecular weight calculations were performed using VISCOTEK TriSEC software Version 3.0.

Differential Scanning calorimetry (DSC) is used to measure crystallinity in the polymers. About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)). Unless otherwise stated, melting point(s) ($T_m$) of each polymer is determined from the second heat curve

TABLE 2

| | MFR (230° C./ 2.16 kg) | Wt % PP from HTLC Separation | Mw Kg/mol | Mw/Mn | Total Wt % $C_2$ | Tm (° C.) Peak 1 (Peak 2) | Tc (° C.) | Melt Enthalpy (J/g) | Tg (° C.) |
|---|---|---|---|---|---|---|---|---|---|
| CBC | 3.6 | 13.2 | 146 | 2.76 | 46.7 | 130 (114) | 97 | 126 | −11 |

(peak Tm), and the crystallization temperature ($T_c$) is determined from the first cooling curve (peak Tc).

13C Nuclear Magnetic Resonance (NMR) is performed using samples that are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C. The data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acquisition time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition. Comonomer content in the crystalline block composite polymers is measurable using this technique.

High Temperature Liquid Chromatography (HTLC) is performed according to the methods disclosed in U.S. Pat. No. 8,076,147 and US Patent Application Publication No. 2011-152499, both of which are herein incorporated by reference. Samples are analyzed by the methodology described below.

A Waters GPCV2000 high temperature SEC chromatograph is reconfigured to build the HT-2DLC instrumentation. Two Shimadzu LC-20AD pumps are connected to the injector valve in GPCV2000 through a binary mixer. The first dimension (D1) HPLC column is connected between the injector and a 10-port switch valve (Valco Inc). The second dimension (D2) SEC column is connected between the 10-port valve and LS (Varian Inc.), IR (concentration and composition), RI (refractive index), and IV (intrinsic viscosity) detectors. RI and IV are built-in detector in GPCV2000. The IR5 detector is provided by PolymerChar, Valencia, Spain.

Columns: The D1 column is a high temperature Hypercarb graphite column (2.1×100 mm) purchased from Thermo Scientific. The D2 column is a PLRapid-H column purchased from Varian (10×100 mm).

Reagents: HPLC grade trichlorobenzene (TCB) is purchased from Fisher Scientific. 1-Decanol and decane are from Aldrich. 2,6-Di-tert-butyl-4-methylphenol (Ionol) is also purchased from Aldrich.

Sample Preparation: 0.01-0.15 g of polyolefin sample is placed in a 10-mL Waters autosampler vial. 7-mL of either 1-decanol or decane with 200 ppm Ionol is added to the vial afterwards. After sparging helium to the sample vial for about 1 min, the sample vial is put on a heated shaker with temperature set at 160° C. The dissolution is done by shaking the vial at the temperature for 2 hr. The vial is then transferred to the autosampler for injection.

HT-2DLC: The D1 flow rate is at 0.01 mL/min. The composition of the mobile phase is 100% of the weak eluent (1-decanol or decane) for the first 10 min of the run. The composition is then increased to 60% of strong eluent (TCB) in 489 min. The data is collected for 489 min as the duration of the raw chromatogram. The 10-port valve switches every three minutes yielding 489/3=163 SEC chromatograms. A post-run gradient is used after the 489 min data acquisition time to clean and equilibrate the column for the next run:

Clean Step:
1. 490 min: flow=0.01 min; //Maintain the constant flow rate of 0.01 mL/min from 0-490 min.
2. 491 min: flow=0.20 min; //Increase the flow rate to 0.20 mL/min.
3. 492 min: % B=100; //Increase the mobile phase composition to 100% TCB
4. 502 min: % B=100; //Wash the column using 2 mL of TCB Equilibrium Step:
5. 503 min: % B=0; //Change the mobile phase composition to 100% of 1-decanol or decane
6. 513 min: % B=0; //Equilibrate the column using 2 mL of weak eluent
7. 514 min: flow=0.2 mL/min; //Maintain the constant flow of 0.2 mL/min from 491-514 min
8. 515 min: flow=0.01 mL/min; //Lower the flow rate to 0.01 mL/min.

After step 8, the flow rate and mobile phase composition are the same as the initial conditions of the run gradient.

The D2 flow rate was at 2.51 mL/min. Two 60 μL loops are installed on the 10-port switch valve. 30-μL of the eluent from D1 column is loaded onto the SEC column with every switch of the valve.

The IR, LS15 (light scattering signal at 15°, LS90 (light scattering signal at) 90°, and IV (intrinsic viscosity) signals are collected by EZChrom through a SS420X analogue-to-digital conversion box. The chromatograms are exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

Calculation of Composition of Crystalline Block Composite a summation of the weight % propylene from each component in the polymer according to equation 1 results in the overall weight % propylene and/or ethylene (of the whole polymer). This mass balance equation can be used to quantify the amount of the PP and PE present in the block copolymer. This mass balance equation can also be used to quantify the amount of PP and PE in a binary blend or extended to a ternary, or n-component blend. For the crystalline block composite, the overall amount of PP or PE is contained within the blocks present in the block and the unbound PP and PE polymers.

$$\text{Wt \% C3}_{Overall} = w_{PP}(\text{wt \% C3}_{PP}) + w_{PE}(\text{wt \% C3}_{PE}) \qquad \text{Eq. 1}$$

where
$w_{PP}$=weight fraction of PP in the polymer
$w_{PE}$=weight fraction of PE in the polymer
wt % $C3_{PP}$=weight percent of propylene in PP component or block
wt % $C3_{PE}$=weight percent of propylene in PE component or block.

Note that the overall weight % of propylene ($C_3$) is preferably measured from $C^{13}$ NMR or some other composition measurement that represents the total amount of $C_3$ present in the whole polymer. The weight % propylene in the PP block (wt % $C_{3PP}$) is set to 100 or if otherwise known from its DSC melting point, NMR measurement, or other composition estimate, that value can be put into its place. Similarly, the weight % propylene in the PE block (wt % $C_{3PE}$) is set to 100 or if otherwise known from its DSC melting point, NMR measurement, or other composition estimate, that value can be put into its place.

Crystalline Block Composite Index (CBCI) is measured based on the method shown in Table 3, below. In particular, CBCI provides an estimate of the quantity of block copolymer within the crystalline block composite under the assumption that the ratio of CEB to CAOB within a diblock copolymer is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in this example the CAOP) and polyethylene (in this example the CEP). Consequently, the polyethylene fraction contains an appreciable amount of propylene that would not otherwise be present if the polymer was simply a blend of polypropylene and polyethylene. To account for this "extra propylene", a mass balance calculation can be performed to estimate the CBCI from the amount of the polypropylene and polyethylene fractions and the weight percent propylene present in each of the fractions that are separated by high temperature liquid chromatography (HTLC).

CBCI is calculated as shown in Table 3 based on the following:

TABLE 3

| Line # | Variable | Source | CBCI |
|---|---|---|---|
| 1 | Overall wt % C3 Total | Measured | 53.3 |
| 2 | wt % C3 in PP block/polymer | Measured | 99.0 |
| 3 | wt % C3 in PE block/polymer | Measured | 10.0 |
| 4 | wt fraction PP (in block or polymer) | Eq. 2 below | 0.487 |
| 5 | wt fraction PE (in block or polymer) | 1-Line 4 | 0.514 |
| | Analysis of HTLC Separation | | |
| 6 | wt fraction isolated PP | Measured | 0.132 |
| 7 | wt fraction PE fraction | Measured | 0.868 |
| 8 | wt % C3 in PE-fraction | Eq. 4 below | 46.350 |
| 9 | wt fraction PP-diblock in PE fraction | Eq. 6 below | 0.408 |
| 10 | wt fraction PE in PE fraction | 1-Line 10 | 0.592 |
| 11 | wt fraction Diblock in PE fraction | 10/Line 4 | 0.840 |
| 12 | Crystalline Block Composite Index (CBCI) | Eq. 7 below | 0.729 |

Referring to Table 3, above, crystalline block composite index (CBCI) is measured by first determining a summation of the weight percent propylene from each component in the polymer according to Equation 1, below, which results in the overall weight percent, as discussed above with respect to the Methods for Calculation of Composition of Crystalline Block Composite. In particular, the mass balance equation is as follows:

$$\text{Wt \% } C3_{Overall} = w_{PP}(\text{wt \% } C3_{PP}) + w_{PE}(\text{wt \% } C3_{PE}) \quad \text{Eq. 1}$$

where
$w_{PP}$=weight fraction of PP in the polymer
$W_{PE}$=weight fraction of PE in the polymer
wt % $C3_{PP}$=weight percent of propylene in PP component or block
wt % $C3_{PE}$=weight percent of propylene in PE component or block For calculating the Ratio of PP to PE in the crystalline block composite:

Based on Equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{\text{wt \% } C3_{Overall} - \text{wt \% } C3_{PE}}{\text{wt \% } C3_{PP} - \text{wt \% } C3_{PE}} \quad \text{Eq. 2}$$

where
$w_{PP}$=weight fraction of PP present in the whole polymer
wt % $C3_{PP}$=weight percent of propylene in PP component or block
wt % $C3_{PE}$=weight percent of propylene in PE component or block To estimate the amount of the block in the Crystalline Block Composite, apply Equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight percent C3 of the whole polymer in the left hand side of Equation 3, and the weight fraction of PP (isolated from HTLC) and the weight fraction of PE (separated by HTLC) into the right hand side of equation 3, the weight percent of C3 in the PE fraction can be calculated using Equations 4 and 5. The PE fraction is described as the fraction separated from the unbound PP and contains the diblock and unbound PE. The composition of the isolated PP is assumed to be the same as the weight percent propylene in the iPP block as described previously.

$$\text{wt \% } C3_{Overall} = \quad \text{Eq. 3}$$
$$w_{PPisolated}(\text{wt \% } C3_{PP}) + w_{PE-fraction}(\text{wt \% } C3_{PE-fraction})$$

$$\text{wt \% } C3_{PE-fraction} = \frac{\text{wt \% } C3_{Overall} - w_{PPisolated}(\text{wt \% } C3_{PP})}{w_{PE-fraction}} \quad \text{Eq. 4}$$

$$w_{PE-fraction} = 1 - w_{PPisolated} \quad \text{Eq. 5}$$

where
$w_{PPisolated}$=weight fraction of isolated PP from HTLC $w_{PE-fraction}$=weight fraction of PE separated from HTLC, containing the diblock and unbound PE wt % $C3_{PP}$=weight percent of propylene in the PP; which is also the same amount of propylene present in the PP block and in the unbound PP wt % $C3_{PE-fraction}$=weight percent of propylene in the PE-fraction that was separated by HTLC wt % $C3_{Overall}$=overall weight percent propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP-diblock} = \frac{\text{wt \% } C3_{PE-fraction} - \text{wt \% } C3_{PE}}{\text{wt \% } C3_{PP} - \text{wt \% } C3_{PE}} \quad \text{Eq. 6}$$

Where wt % $C3_{PE-fraction}$=weight percent of propylene in the PE-fraction that was separated by HTLC (Equation 4)

wt % $C3_{PP}$=weight percent of propylene in the PP component or block (defined previously)

wt % $C3_{PE}$=weight percent of propylene in the PE component or block (defined previously)

$w_{PP-diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP-diblock}$) multiplied by two. Another way to calculate this is by dividing the weight fraction of PP in the diblock ($w_{PP-diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by Equation 7. To estimate the CBCI, the weight fraction of diblock in the PE fraction calculated using Equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP-diblock}}{w_{PP}} \cdot w_{PE-fraction} \quad \text{Eq. 7}$$

where $w_{PP-diblock}$=weight fraction of PP in the diblock separated with the PE-fraction by HTLC (Equation 6)

$w_{PP}$=weight fraction of PP in the polymer $w_{PE-fraction}$=weight fraction of PE separated from HTLC, containing the diblock and unbound PE (Equation 5)

For example, if an iPP-PE (i.e., isotactic polypropylene block and propylene-ethylene block) polymer contains a total of 53.3 wt % C3 and is made under the conditions to produce an PE polymer with 10 wt % C3 and an iPP polymer containing 99 wt % C3, the weight fractions of PP and PE are 0.487 to 0.514, respectively (as calculated using Equation 2).

Preparation of Exemplary Formulations

Table 4 has the details of the materials used in exemplary formulations.

TABLE 4

| Material | Description |
|---|---|
| CBC | EP/iPP block copolymer discussed above (approximately 50/50, 90% C2 in EP, 3.6 MFR) |
| LOTADER ® AX8840 | Glycidyl methacrylate ethyl ene copolymer, MI* = 5 g/10 min (at 190° C. and 2.16 kg, ASTM D 1238), 8% GMA, obtained from Arkema |
| AMPLIFY ™ IO 3801 | Ethylene ionomer, neutralized with sodium, MI* = 1.3 g/10 min (at 190° C. and 2.16 kg, ASTM D 1238), Acrylic acid content is 8.8% before neutralization |
| PP H110-02N ("PP H110") | Homo polypropylene (PP), MFR = 2 g/10 min (at 230° C. and 2.16 kg, ASTM D 1238), obtained from Braskem |
| PP D221.00 ("PP D221") | Homo PP, MFR = 35 g/10 min (at 230° C. and 2.16 kg, ASTM D 1238), obtained from Braskem |
| Irganox ® B225 | Antioxidant (available from BASF) |

The compounding of polymeric components is performed on Haake Rheomix 3000 mixer rotating at 50 revolutions per minute (rpm). The final torque for Haake mixing is shown in Table 5, below. The final torque was varied based at least on whether the formulation includes Lotader® 8840. The raw materials are dry mixed before adding to the mixer. In particular, the raw materials are dry mixed before adding to the mixer, with a total mass of 200 gram. The mixer is preheated to 190° C. and the mixing is conducted for 5 minutes after the ram is secured down. The amount for each component in Tables 5-8 is based on parts by weight.

Referring to Table 5, Working Examples 1 to 3 and Comparative Examples A to D are prepared according to the following formulations:

TABLE 5

| Examples | PP D221 | PP H110 | AMPLIFY ™ IO 3801 | CBC | Lotader ® 8840 | Irganox ® B225 | Final torque for Haake mixing (gf) |
|---|---|---|---|---|---|---|---|
| Working Ex. 1 | 26.4 | — | 61.6 | 6.0 | 6.0 | 0.2 | 3100 |
| Working Ex. 2 | 44.0 | — | 44.0 | 6.0 | 6.0 | 0.2 | 2800 |
| Working Ex. 3 | 35.2 | — | 52.8 | 6.0 | 6.0 | 0.2 | 3200 |
| Comparative Ex. A | 30.0 | — | 70.0 | — | — | 0.2 | 2481 |

TABLE 5-continued

| Examples | PP D221 | PP H110 | AMPLIFY™ IO 3801 | CBC | Lotader® 8840 | Irganox® B225 | Final torque for Haake mixing (gf) |
|---|---|---|---|---|---|---|---|
| Comparative Ex. B | 28.2 | — | 65.8 | 6.0 | — | 0.2 | 2436 |
| Comparative Ex. C | 28.2 | — | 65.8 | — | 6.0 | 0.2 | 3200 |
| Comparative Ex. D | — | 55.8 | 30.0 | — | 6.0 | 0.2 | 3200 |

Referring to Tables 6 and 7, below, Working Examples 1 to 3 and Comparative Examples A to E are evaluated for the following properties:

TABLE 6

| | PP D221 | PP H110 | AMPLIFY™ IO 3801 | CBC | Lotader® 8840 | Irganox® B225 | Scratch/Mar initiation | Hardness (Shore D) | 2% Mod (psi) | Toughness (in*lbf) | Ult. Elongation (%) |
|---|---|---|---|---|---|---|---|---|---|---|---|
| Ex. 1 | 26.4 | — | 61.6 | 6.0 | 6.0 | 0.2 | E | 53.4 | 38827 | 2.7 | 19.2 |
| Ex. 2 | 44.0 | — | 44.0 | 6.0 | 6.0 | 0.2 | D | 60.8 | 56158 | 19.9 | 113 |
| Ex. 3 | 35.2 | — | 52.8 | 6.0 | 6.0 | 0.2 | D | 59.2 | 52255 | 10.5 | 67 |
| Ex. A | 30.0 | — | 70.0 | — | — | 0.2 | E | 54.7 | 32679 | 1.3 | 13.6 |
| Ex. B | 28.2 | — | 65.8 | 6.0 | — | 0.2 | E | 53.8 | 35210 | 6.7 | 58.6 |
| Ex. C | 28.2 | — | 65.8 | — | 6.0 | 0.2 | E | 55.0 | 36473 | 0.6 | 6.5 |
| Ex. D | — | 55.8 | 30.0 | — | 6.0 | 0.2 | A | 57.1 | 65149 | 18 | 89 |
| Ex. E | PP D221 | | | | | | A | 68.8 | 108406 | 2.1 | 8.2 |

TABLE 7

| | PP D221 | AMPLIFY™ IO 3801 | CBC | Lotader® 8840 | Irganox® B225 | Adhesion to PP D221 Substrate |
|---|---|---|---|---|---|---|
| Ex. 1 | 26.4 | 61.6 | 6.0 | 6.0 | 0.2 | Excellent, no delamination |
| Ex. 2 | 44.0 | 44.0 | 6.0 | 6.0 | 0.2 | Excellent, no delamination |
| Ex. 3 | 35.2 | 52.8 | 6.0 | 6.0 | 0.2 | Excellent, no delamination |
| Ex. A | 30.0 | 70.0 | — | — | 0.2 | Poor, delamination |
| Ex. B | 28.2 | 65.8 | 6.0 | — | 0.2 | Poor, delamination |
| Ex. C | 28.2 | 65.8 | — | 6.0 | 0.2 | Excellent, no delamination |

Working Examples 1, 2, and 3 possess a combination of properties of each of improved scratch/mar, good tensile toughness, and excellent adhesion to a polypropylene (PP) substrate prepared with PP D221. With respect to adhesion to the PP substrate, the test demonstrates the manufacturing and interlayer adhesion of the specified laminates, in particular between the disclosed formulations and the PP substrate. Comparative Example A shows good scratch/mar resistance, but poor toughness and poor adhesion to PP. Comparative Example B shows good scratch/mar and reasonable toughness but poor adhesion to PP. Comparative Example C shows good scratch/mar and adhesion to PP but poor toughness. Comparative Example D shows that poor scratch/mar is obtained when the amount of the ionomer is decreased and the amount of the propylene is increased. Comparative Example E shows poor scratch/mar and poor toughness. Without being limited to theory, it is hypothesized that for the Working Examples 1 to 3, the phase inversion after vulcanization of the ionomer component induces a continuous polypropylene phase that containing domains of cross-linked ionomer thereby improving the adhesion with the polypropylene substrate. It is further hypothesized that CBC may act as a compatibilizer that improves tensile toughness in the working examples by providing compatibility between the ionomer and the polypropylene in the compositions.

From Table 6 it may be seen that the Working Examples 1 to 3 display a toughness of greater than 2.2 in*lbf, which is greater than ones of the comparative compositions that do not contain the CBC. These compositions also display an increased ultimate tensile elongation and 2% secant modulus, when compared with ones of the comparative compositions that do not contain the CBC. Also, compositions that have 40 to 65 wt % ionomer have a Shore D hardness of 55 to 63. Further, from Table 7 it may be seen that the Working Examples 1 to 3 display better adhesion to the PP substrate than comparative compositions that do not contain Lotader® 8840.

Hardness was determined as per a Shore D hardness protocol. Measurements were made for a time period of 15 seconds.

Scratch/mar tests were conducted with the Ford 5 Finger Scratch/Mar test where five spherical scratch tips of 0.5 mm are used for testing and the normal dead load can vary from 1.38 to 11.03 Newton (N) by adding weight plates. The rate at which the scratches are made is controlled by a compressed air pump and is approximately 100 mm/s. The load at which scratch is visible is recorded. "A" stands for smallest load and "E" is the highest load. Samples were conditioned and tested in a controlled atmosphere of 23° C. and 50% humidity. Table 8 shows the various loads used in the Ford 5 Finger Scratch/mar test.

TABLE 8

| #A-140.8 grams | #A-1.38 Newton |
| #B-278.5 grams | #B-2.73 Newton |
| #C-554.9 grams | #C-5.44 Newton |

TABLE 8-continued

| #D-693.3 grams | #D-6.78 Newton |
| #E-1124.3 grams | #E-11.03 Newton |

Stress-strain behavior in uniaxial tension was measured using ASTM D1708 microtensile specimens. The gauge length of the samples is 22 millimeter and samples were stretched with an Instron at 554% per minute at 23° C. Tensile strength and elongation at break were reported for an average of 5 specimens. The plaques were used for microtensile test were prepared by compression molding using a Tetrahedron press. The polymer was pre-melted at 190° C. for 1 minute at 5 kilopounds and then pressed for 5 minutes at 30 kilopounds and then quenched in an ice water bath. The nominal plaque thickness was 2.9 mm.

Face-to-face bonded plaques were used for a T-peel adhesion force test. The compositions used for this test are some of the compositions shown in the Table 7. Referring to Table 7, each of the compositions were manufactured in laminate form by melt bonding two compression molded plaques to form the adherent pair, which was then subjected to testing. The compression molded plaque for melt bonding is 1 millimeter in thickness from which the peel specimen is cut using a die and extracted for testing. It is desired that all peel specimens fail at bonding zone so that the true adhesive force (e.g., the force of adhesion at the bond interface) can be measured. It is also desired that the adhesive force has minimum contribution from the bending force of the specimen. Therefore the 1-mm thickness was selected to balance the tradeoff between minimizing the tensile yielding of the layer during the peel test (which requires that the specimen thickness be maximized) and minimizing the bending force the layers (which requires minimizing the specimen thickness).

The sample preparation is detailed as follows:

1st step: Compression mold individual plaques at 190° C. under 25000 pounds per square inch (psi) pressure, for 5 minutes.

2nd step: Stack a pair of plaques molded in the $1^{st}$ step and re-mold at 190° C. under 200 psi contact pressure for 10 minutes.

3rd step: The bonded plaques were conditioned in ASTM environment for 48 hours prior to the peel test. The bonded plaque was cut into 25 mm by 250 mm strips, with about 75 mm long legs by a NAEF® punch press.

T-Peel Test protocol: The test method used is a 180° peel strength measurement on a partially pre-peeled film with a constant stretching rate of 254 mm/minute. All the measurements were conducted in a temperature controlled room at 23° C. The strip was gripped and peeled by an INSTRON Model 1122, manufactured by INSTRU-MET Corporation. The INSTRON was operated with pneumatic grips, separating the two specimen legs at 180°, leaving the bonded area at 90° with each leg, starting from an initial distance between the two grips of about 50 mm, and using a constant separation speed of 254 mm/min. Each specimen is pulled for 75 mm. Stress-strain curves were recorded for 5 independent specimens per pair. Average Peak Load is reported as the average adhesion strength between marker at the beginning of the peel and the end at the highest load and averaged. The results are shown in the Tables 7, above.

What is claimed is:

1. A composition comprising:
    a propylene based polymer;
    a polymeric ethylene ionomer;
    a vulcanizing agent that is a crosslinker and that is reactive with the polymeric ethylene ionomer; and
    a compatibilizer that is a crystalline block composite including:
    (1) a crystalline ethylene based polymer,
    (2) a crystalline alpha-olefin based polymer derived from a $C_{3-10}$ α-olefin, and
    (3) a block copolymer comprising 10 to 90 wt % of a crystalline ethylene block comprising at least 85 wt % of units derived from ethylene and 10 to 90 wt % of a crystalline alpha-olefin block comprising at least 90 wt % of units derived from the $C_{3-10}$ α-olefin; wherein the composition is vulcanized during mastication at a temperature of greater than 170° C. and where the vulcanized composition displays a tensile toughness of 2 to 15 in*lbf, a 2% secant modulus of 35,000 to 55,000 pounds per square inch and a Shore D hardness of 55 to 63.

2. The composition of claim 1, where the propylene based polymer is selected from homopolymer polypropylene, random copolymer polypropylene, impact copolymer polypropylene, high impact polypropylene, high melt strength polypropylene, isotactic polypropylene, syndiotactic polypropylene, or a combination comprising at least one of the foregoing polypropylenes and where the propylene based polymer is present in an amount of 20 to 90 wt %, based on a total weight of the composition.

3. The composition of claim 1, where the polymeric ethylene ionomer comprises an acrylic acid ethylene copolymer that is neutralized with a metal salt and where the polymeric ethylene ionomer is present in an amount of 20 to 90 wt %, based on a total weight of the composition.

4. The composition of claim 1, where the crystalline block copolymer composite is present in an amount of 1 to 20 wt %, based on a total weight of the composition.

5. The composition of claim 1, where the composition further comprises an elastomer; and where the elastomer is a homogeneously branched ethylene-α-olefin copolymer, a propylene-α-olefin copolymer, or a combination comprising at least one of the foregoing elastomers and where the elastomer is present in an amount of 1 to 50 wt %, based on a total weight of the composition.

6. The composition of claim 1, where the vulcanizing agent is selected from the group consisting of a) an oxirane containing compound; b) a bisphenol A epoxy resin or a cycloaliphatic epoxy resin; c) a copolymer of a monomer containing an oxirane unit and an olefin monomer; d) a glycidyl methacrylate-olefin copolymer; e) an amine compound; 0 a blend of a guanidine and a hexamethylene diamine carbamate; g) triethylene tetramine h) methylene dianiline and g) a combination thereof.

7. The composition of claim 1, where the propylene based polymer is present in a smaller amount than the polymeric ethylene ionomer.

8. An article manufactured from the composition of claim 1.

9. A method comprising:
    masticating a composition comprising polypropylene, a polymeric ethylene ionomer, a compatibilizer that compatibilizes the polypropylene with the ionomer, and a vulcanizing agent, the compatibilizer being a crystalline block composite that includes:
    (1) a crystalline ethylene based polymer,
    (2) a crystalline alpha-olefin based polymer derived from a $C_{3-10}$ α-olefin, and
    (3) a block copolymer comprising 10 to 90 wt % of a crystalline ethylene block comprising at least 85 wt % of units derived from ethylene and 10 to 90 wt % of a crystalline alpha-olefin block comprising at least 90 wt % of units derived from the $C_{3-10}$ α-olefin; vulcanizing the ionomer during mastication; wherein during mastication the temperature is greater than 170° C. and where a vulcanized composition displays a tensile toughness of 2 to 15 in*lbf, a 2% secant modulus of 35,000 to 55,000 pounds per square inch and a Shore D hardness of 55 to 63; and molding the composition.

* * * * *